United States Patent [19]

Iino

[11] Patent Number: 5,059,956

[45] Date of Patent: Oct. 22, 1991

[54] INDICATION DISPLAY UNIT FOR VEHICLES

[75] Inventor: Tadashi Iino, Susono, Japan

[73] Assignee: Yazaki Corporation, Tokyo, Japan

[21] Appl. No.: 402,404

[22] Filed: Sep. 5, 1989

[30] Foreign Application Priority Data

Sep. 21, 1988 [JP] Japan .............................. 63-122829[U]
Oct. 27, 1988 [JP] Japan .............................. 63-139191[U]

[51] Int. Cl.$^5$ ............................................. G09G 3/02
[52] U.S. Cl. ................................... 340/705; 340/980;
359/630; 359/843; 353/13; 353/14
[58] Field of Search ................. 340/705, 980; 350/174;
353/13, 14

[56] References Cited

U.S. PATENT DOCUMENTS

| 4,635,033 | 1/1987 | Inukai | 340/705 |
| 4,831,366 | 5/1989 | Iino | 340/980 |

FOREIGN PATENT DOCUMENTS

| 2227589 | 11/1974 | France | 340/980 |
| 0142143 | 9/1985 | Japan | 340/705 |
| 60-203545 | 10/1985 | Japan |  |
| 0137236 | 6/1987 | Japan | 340/705 |

Primary Examiner—Joseph A. Orsino
Assistant Examiner—Dov Popovici
Attorney, Agent, or Firm—Armstrong, Nikaido, Marmelstein, Kubovcik & Murray

[57] ABSTRACT

An indication display unit for vehicles according to the present invention includes a reflecting member having a reflecting surface directed to a driver's seat, and an indicating device having an indicating surface directed to the reflecting surface of the reflecting member. Information concerning driving operation of the vehicle indicated on the indicating surface is projected directly or indirectly through a reflecting mirror to the reflecting member so as to be visually observed by the driver by way of the reflection thereon. The invention also includes a drive mechanism for shifting the position of the reflecting member in upward or downward to adjust the height thereof and a solenoid for pivotally shifting the reflecting mirror, when it is used, in response to the movement of the reflecting member for reflecting the information in the most effective angle toward the driver in accordance with the vehicle speed. The present invention provides an effect of indirect visual observation of the image indicated by the indicator always in a preferable state.

8 Claims, 4 Drawing Sheets

INDICATION DISPLAY UNIT FOR VEHICLES

BACKGROUND OF THE INVENTION

1. Field of the Invention

The present invention relates to a reflection type indication display unit for vehicles, adapted for a driver to visually observe the images indicated by an indicator which indicates various operating information, such as vehicle speed, an engine rotating speed, a residual fuel amount, various alarms, etc. through a reflecting surface of a reflecting member.

2. Description of the Prior Art

Heretofore, in a conventional reflection type indication display unit for vehicles, the images indicated by an indicator provided at a hand column side project onto a reflecting plate provided at a dashboard side alternatively the images indicated by the indicator provided at the dashboard side project onto a reflecting mirror provided on the hand column at the steering wheel side. Those images are then reflected to reflecting surface of reflecting plate so that the driver can visually observe the images displayed on the reflecting surface of the reflecting plate, thereby obtaining information necessary for driving the vehicle. Particularly, in the latter type display unit which is provided with a reflecting mirror between the indicator and the reflecting plate, the images are once reflected by the reflecting mirror, and then projected and displayed on the reflecting plate. Accordingly, the distance from the indicating surface of the indicator to the reflecting surface of the reflecting plate is long. Thus, an erect virtual image is formed at a long distance rearwardly of the reflecting surface of the reflecting plate, thereby having an effect of improving visibility of the displayed image by the driver.

However, an optical path of the displaying image, in the reflection type indication display unit for a vehicle, to the driver's eye is always constant. The position of the driver's visual point at the time of driving the vehicle is moved upward at a high speed as compared with that at a low speed. Accordingly, it is necessary for the driver to displace the driver's visual point in accordance with the difference of the vehicle speed so as to visually observe the indicated image, so that the driver may feel inconvenienced at the time of driving the vehicle.

SUMMARY OF THE INVENTION

It is therefore an object of the present invention to provide a reflection type indication display unit for vehicles which can eliminate such an inconvenience and can shift the visually observing position of the indicated image by an indicator.

In order to achieve this and other objects, there is provided, according to this invention, an indication display unit for a vehicle of a type which projects the images, such as driving information to be indicated by an indicator provided at a hand column side, so that the driver can visually observe the images displayed on the reflecting surface of the reflecting plate, or of a type which once projects the images indicated by an indicator provided at a dashboard side onto a reflecting mirror provided on a hand column of a steering wheel side. Then those images are reflected on a reflecting plate provided at the dashboard so that the driver can visually observe the images displayed on the reflecting surface of the reflecting plate as described above. Both type of display units includes a drive mechanism as a means for moving upward and downward the reflecting plate activated by the drive mechanism, to thereby reflect the image, indicated by the indicator, toward the reflecting surface of the reflecting plate.

With the arrangement described above, the position of the reflecting plate and the reflecting mirror for directing the indicated image by the indicator toward a driver's eye can be manually altered as required or automatically altered in accordance with a vehicle speed thereby to move the indicated images to a position near the driver's visual line in response to the driving state. Particularly, the driver can easily confirm the image, indicated by the indicator through the reflecting plate, is shifted to the upward position at the time of driving the vehicle at a high speed.

Other objects and features of the invention will be more fully understood from the following detailed description and appended claims when taken with the accompanying drawings.

DETAILED DESCRIPTION OF THE PREFERRED EMBODIMENTS

First and second embodiments of an indication display unit for vehicles according to the present invention will now be described in detail with reference to the accompanying drawings.

Figure 1:
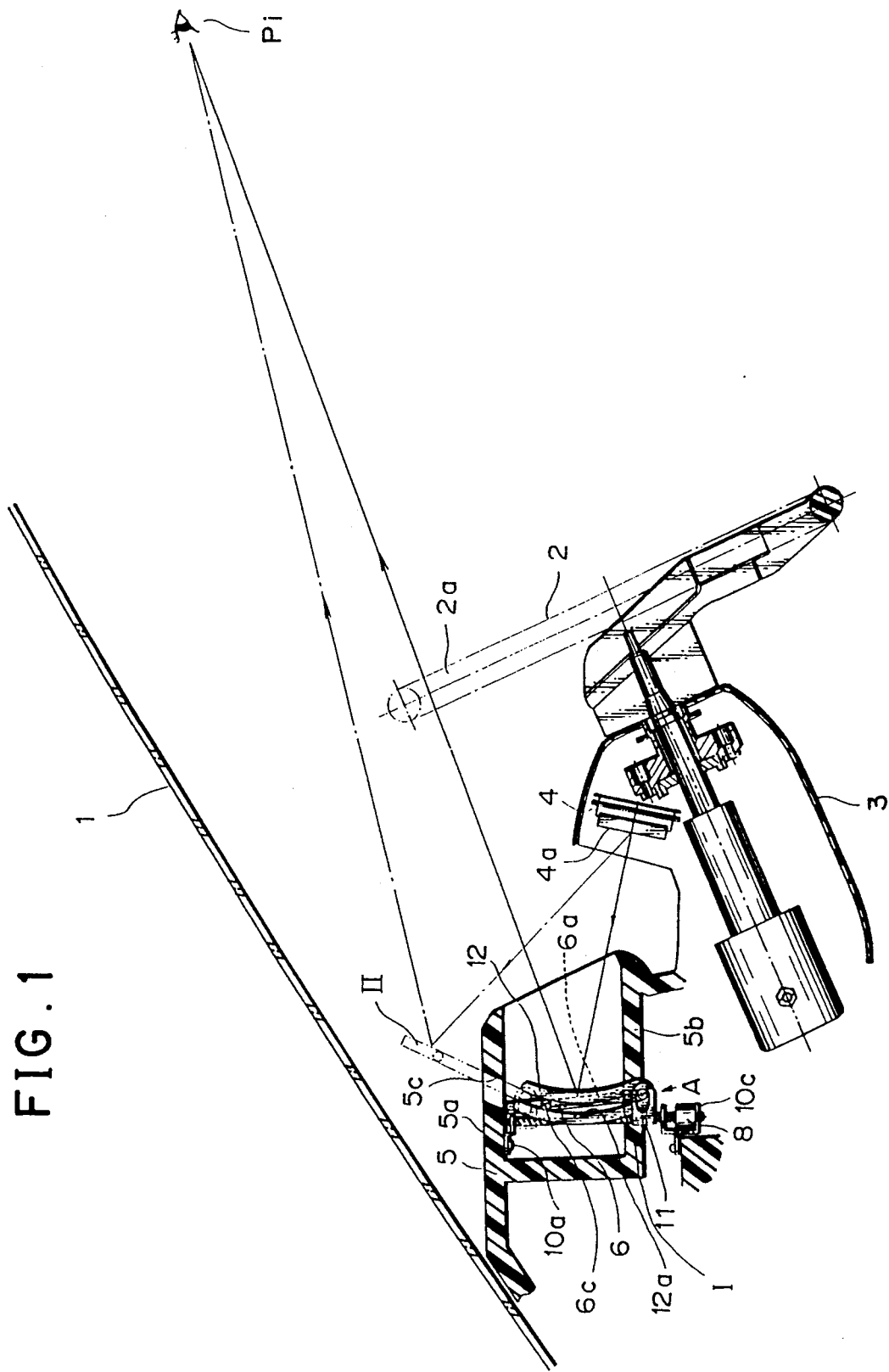
FIG. 1 is a sectional view of a first embodiment of a reflection type indication display unit for vehicles according to the present invention.
Figure 2:
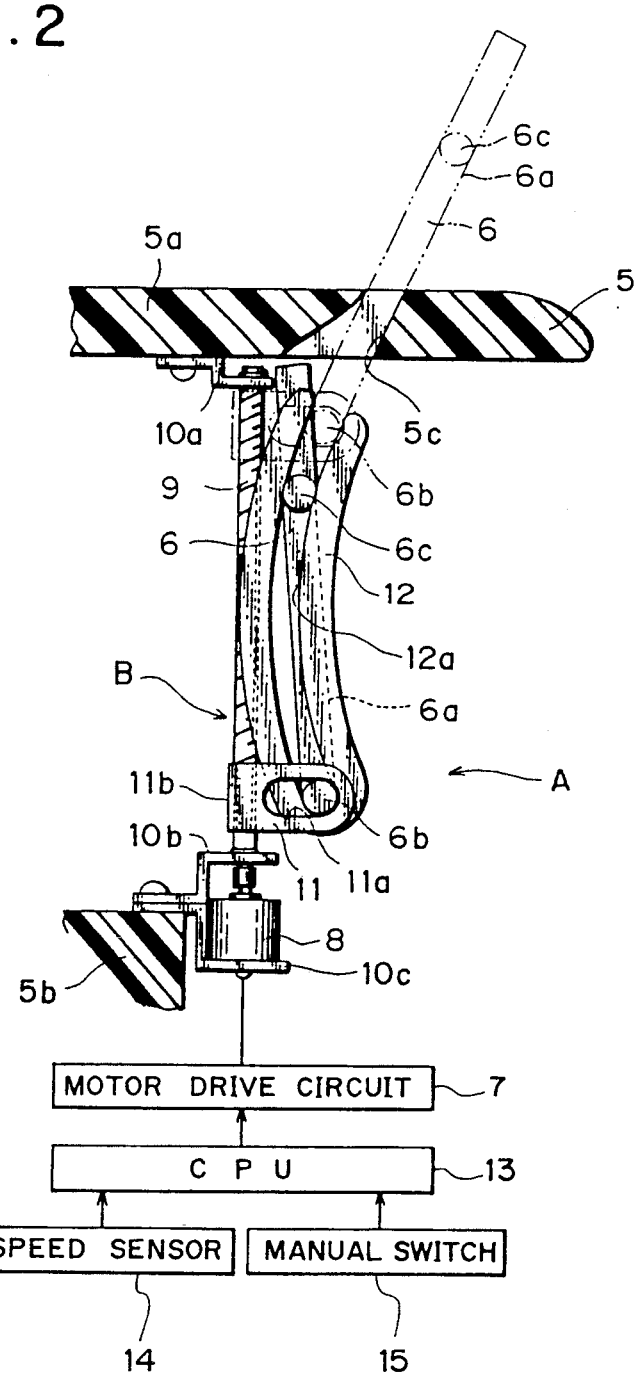
FIG. 2 is a partly magnified side view of a reflector portion of FIG. 1.

FIG. 1 shows the relationship between the indication display unit for vehicles in the first embodiment of the present invention and the position of a driver's eye, and FIG. 2 shows an essential portion of a reflecting plate of the indication display unit of the embodiment in FIG. 1.

Reference numeral 1 denotes a windshield for a vehicle, numeral 2 denotes a steering wheel, and an indicator 4 is disposed in a hand column 3 provided forwardly of the steering wheel 2. The indicator 4 is disposed in such a manner that the indicating surface 4a thereof is opposed to the reflecting surface 6a of a reflecting plate 6 of a reflector A provided in a dashboard 5.

The reflector A comprising the above reflecting plate has a drive mechanism B for moving the reflecting plate 6 between a lower first position designated by (I) and an upper second position designated by (II).

More specifically, as shown in FIG. 2, a male threaded rod 9, at one end of which a reversibly rotatable electric motor 8 controlled by a motor drive circuit 7 is disposed, is supported between the upper wall 5a and the lower wall 5b of the dashboard 5. Symbols 10a, 10b and 10c denote supporting brackets of the motor 8 and the male threaded rod 9.

The female threaded portion 11b, of an elevation arm 11 having a lateral long opening 11a to be engaged with one end of a shaft 6b provided at the lower end of the reflecting plate 6, is engaged with the male threaded rod 9. A guide member 12, which is formed with a guide slot 12a and the upper end thereof is opened, is disposed for guiding the shaft 6b of the reflecting plate 6 between the upper wall 5a and the lower wall 5b of the dashboard 5 in such a manner that the reflecting plate 6 may be accurately moved from the lower position (I) to the upper position (II) in accordance with rotation of the male threaded rod 9. The reflecting plate 6, which is formed with a second shaft 6c to be engaged with the guide slot 12a of the guide member 12, is provided at a side portion near the uppermost portion thereof so as to firmly hold its position at its lower position (I). The second shaft 6c is engaged with the guide slot 12a of the guide member 12 so as to play a role for guiding the end of the reflecting plate 6 to the guide opening 5c of the upper wall 5a of the dashboard 5.

The guide opening 5c is formed in the upper wall 5a of the dashboard 5 so as to move the reflecting plate 6 from the lower position (I) to the upper position (II), and also used as the positioning member of the reflecting plate 6 at the end of the guide opening 5c when the reflecting plate 6 is moved to the upper position (II) so as to set the reflecting plate 6 at a predetermined angle.

In an actual functional movement, the electric motor 8 is rotated at a vehicle speed higher than the predetermined speed thereof so as to shift the position of the reflecting plate 6 in response to the speed of the vehicle, and a CPU 13 is provided for controlling the motor drive circuit 7 to move the reflecting plate 6 from the lower position (I) to the upper position (II). The CPU 13 compares the speed of the vehicle detected by a vehicle speed sensor 14 with a predetermined speed, and while the speed is lower than the predetermined speed, it inhibits to activate the motor drive circuit 7, whereas it activates the motor drive circuit 7 when the speed becomes higher than the predetermined speed, so that the rotations of the motor 8 and the male threaded rod 9 transform the reflecting plate 6 from the lower position (I) to the upper position (II) by means of the female threaded portion 11b of the elevation arm 11. When the vehicle is decelerated from the high speed to the low speed, a signal for reversely rotating the motor 8 is sent to the motor drive circuit 7 from the CPU, so that the reflecting plate 6 is returned from the upper position (II) to the lower position (I).

A steering mechanism is disposed in the hand column 3, and constructed in a structure that the steering wheel 2 can be moved upward or downward, and forward or backward directions by unlocking a steering shaft rod in response to the driver's physical construction and his driving attitude.

With the arrangement described above, when the vehicle is stopped or traveling at a low speed, the motor drive circuit 7 is not activated, the motor 8 is held in the stopping state, and the driver can observe the images indicated on the displaying surface 4a of the indicator 4 by the reflecting surface 6a of the reflecting plate 6 positioned at the lower position (I) between the upper wall 5a and the lower wall 5b of the dashboard 5 through an upper semicircular space 2a of the steering wheel 2. When the vehicle is stopped or traveled at a low speed, since the driver's visual point observes a position near the front of the vehicle, the reflecting plate 6 disposed in the dashboard 5 can be readily observed by the driver.

The operating function of the first embodiment described above will be further described in detail. When the vehicle speed reaches a predetermined speed, the speed signal from the speed sensor 14 exceeds the set reference speed signal, so that the motor drive circuit 7 is activated by the signal from the CPU 13, and the motor 8 is driven in a predetermined direction. As a result, the elevation arm 11 having the female threaded portion 11b is raised upon rotation of the male threaded rod 9, and the reflecting plate 6 having the shaft 6b engaged with the lateral long opening 11a of the elevation arm 11 is moved together with the elevation arm 11 toward the upper position (II). In this case, the shaft 6b and the upper second shaft 6c of the reflecting plate 6 are guided to the guide slot 12a of the guide member 12, the upper end of the reflecting plate 6 is raised through the guide opening 5c formed in the upper wall 5a of the dashboard 5, the shaft 6b of the lower end of the reflecting plate 6 is stopped at the upper end position of the male threaded rod 9, and a part of the reflecting plate 6 is supported by an end portion of the guide opening 5c of the upper wall member 5a of the dashboard 5. Thus, the reflecting surfaces 6a of the reflecting plate 6 is inward-inclinedly supported as compared with the state disposed at the lower position (I) of the reflecting plate 6, and the image indicated on the surface 4a of the indicator 4 can be visually observed by the driver as shown in FIG. 1.

Figure 3:
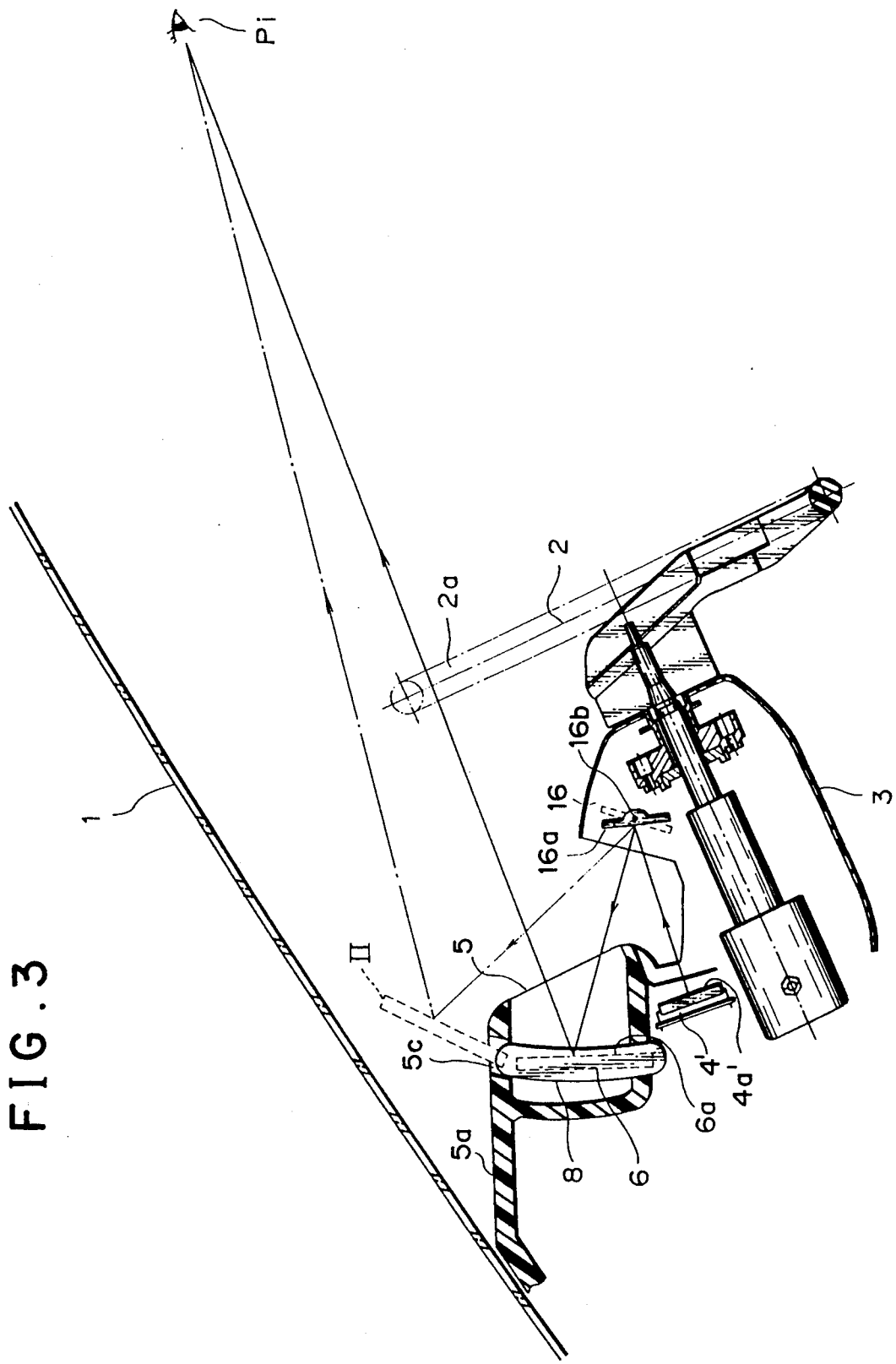
FIG. 3 is a sectional view of a second embodiment of a reflection type indication display unit for vehicles according to the present invention.
Figure 4:
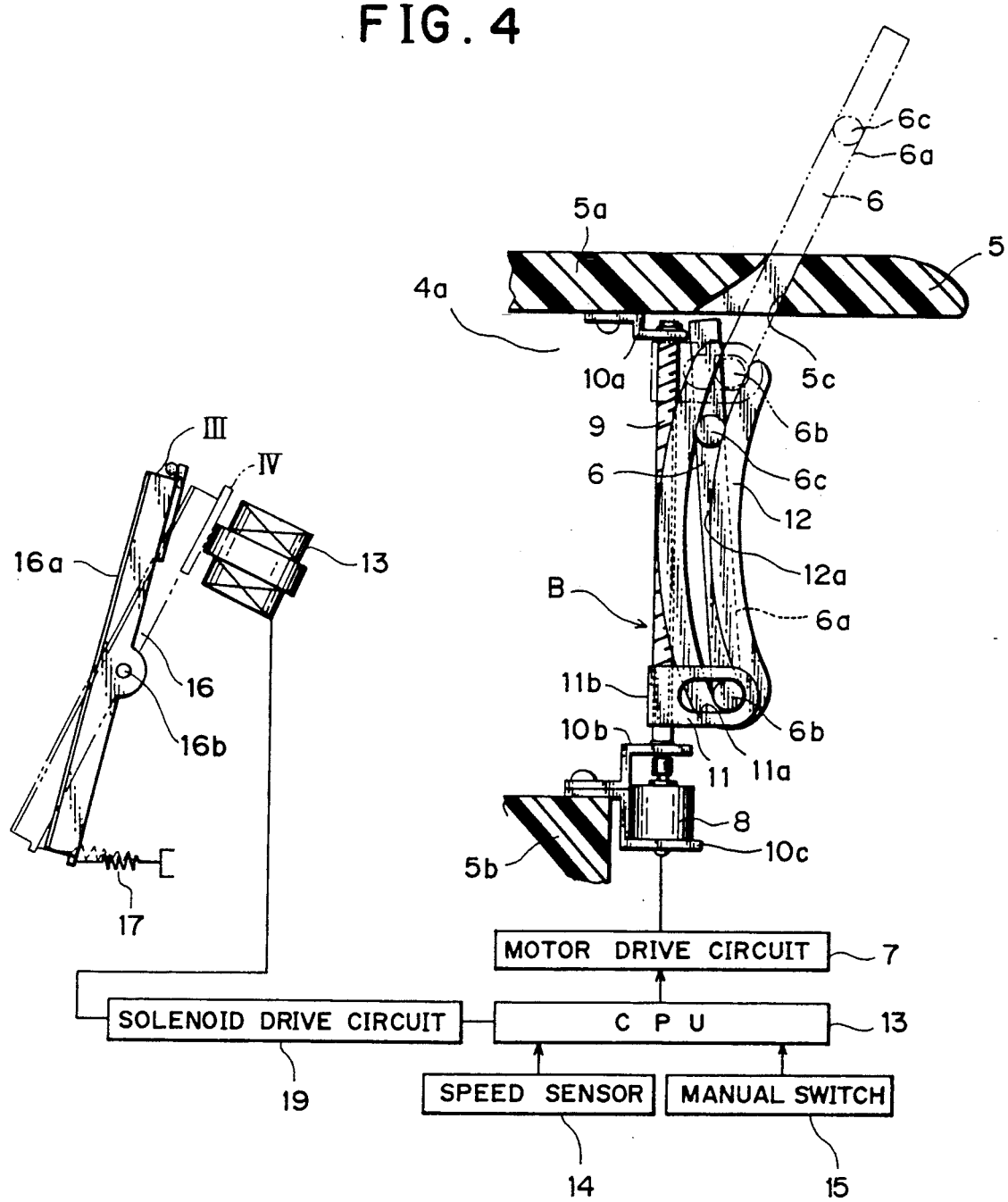
FIG. 4 is a partly magnified side view of an essential portion of the display unit of FIG. 3.

In the second embodiment of the present invention, an indicator is mounted not at the hand column side but at the dashboard side, and a reflecting mirror is mounted at the hand column side. FIGS. 3 and 4 show the second embodiment of the invention, wherein the same members as those in FIGS. 1 and 2 are designated by the same or equivalent reference numerals.

In FIGS. 3 and 4, reference numeral 1 denotes a windshield for a vehicle, numeral 2 denotes a steering wheel, numeral 3 denotes a hand column, and numeral 5 denotes a dashboard. An indicator 4' for indicating driving information and a reflecting plate 6, whose reflecting surface 6a is directed toward a driver seated on a driver's seat in a vehicle, are provided at the dashboard 5 side, and a reflecting mirror 16 whose reflecting surface 16a is directed toward the reflecting surface 6a of the reflecting plate 6 is provided at the hand column 3 side. Thus, images indicated on the surface 4a' of the indicator 4' are reflected on the reflecting surface 16a of the reflecting mirror 16, and then projected to the reflecting surface 6a of the reflecting plate 6, so that the projected images are finally reflected by the reflecting surface 6a of the reflecting plate 6 toward the direction of the driver's eye point Pi and visually observed by the driver.

The reflecting plate 6 provided at the dashboard 5 side is driven by an electric motor 8 and a drive mechanism B for activating the motor 8 (FIG. 4), and constructed in such a manner as to be moved under the guidance of a guide member 12 as described in detail in the case of the first embodiment between a first position (I) contained in the dashboard 5 opposing to the driver seated on a driver's seat and a second position (II) protruded above upper surface 5a of the dashboard 5. In order to move the reflecting plate 6 between the first and second positions, the upper wall 5a of the dashboard 5 is formed with an opening 5c, which is the same construction as that in the first embodiment.

On the other hand, a reflecting mirror 16 provided at the hand column 3 side is always urged in one direction by a spring 17 to be contacted with a stopper 18, and constructed in such a manner as to be rotated at a predetermined angle with respect to its rotary shaft 16b between a first position (III) where the reflecting surface 16a of the reflecting mirror 16 is directed toward the reflecting surface 6a of the reflecting plate 6 located at the first position (I), and a second position (IV) where it is moved by a solenoid 18 against the force of the spring 17 and directed toward the reflecting surface 6a of the reflecting plate 6 located at the second position (II).

A drive mechanism B for driving the reflecting plate 6 between the first and second positions has, as shown in FIG. 4, a male threaded rod 9 which is rotatably supported at the both ends thereof by supporting brackets 10a and 10b between the upper wall 5a and the lower wall 5b formed in the dashboard 5 and also coupled with the rotary shaft of the motor 8 at the lowest end thereof. The female threaded portion 11b of an elevation arm 11 having a lateral long hole 11a to be engaged with the shaft 6b formed at the lower end of the reflecting plate 6 is engaged with the male threaded rod 9. Symbol 10c denotes a supporting bracket for mounting the motor.

Since the process for moving the reflecting plate 6 by means of the guide member 12 from the first position (I) to the second position (II) is same as that in the first embodiment, the description will be omitted.

In a actual functional movement of this second embodiment, the electric motor 8 is rotated at a vehicle speed higher than the predetermined speed thereof so as to shift the position of the reflecting plate 6 in response to the speed of the vehicle, and a CPU 13 is provided for controlling the motor drive circuit 7 to move the reflecting plate 6 from the first position (I) to the second position (II) and also for controlling the solenoid drive circuit 19 to rotate the reflecting mirror 16 from the first position (III) to the second position (IV).

The CPU 13 compares the speed of the vehicle detected by a vehicle speed sensor 14 with a predetermined speed, and while the speed is lower than the predetermined speed, it inhibits the motor drive circuit 7 and the solenoid drive circuit 19, whereas it activates the motor drive circuit 7 and the solenoid drive circuit 19 when the vehicle speed becomes higher than the predetermined speed, so that the motor 8 is rotated in one direction, and the solenoid 20 is energized. The male threaded rod 9 is rotated by the rotation of the motor 8, thereby moving the reflecting plate from lower first position (I) to the upper second position (II). The reflecting mirror 16 is rotated by the energization of the solenoid 20 from the first position (III) to the second position (IV).

When the vehicle is decelerated from a high speed to a lower speed, a signal for reversely rotating the motor 8 is sent to the motor drive circuit 7, and a signal for deenergizing the solenoid 20 is sent to the solenoid drive circuit 19 respectively by the CPU. Accordingly, the reflecting plate 6 is moved from the upper second position (II) to the lower first position (I), and the reflecting mirror 16 is rotated from the second position (IV) to the first position (III).

In order to control the positions of the reflecting plate 6 and the reflecting mirror 16, it is necessary to know the present positions thereof. To this end, switch means, not shown, for detecting at which of the first and second positions the reflecting plate 6 is presently positioned may be provided.

With the arrangement described above, if the vehicle is stopped or traveling at a low speed when the reflecting member 6 is positioned at the first position, the motor drive circuit 7 and the solenoid drive circuit 19 are not activated, so that the motor 8 remains stopped and the solenoid 20 remains deenergized, and the driver can observe the images indicated on the surface 4a' of the indicator 4' by means of the reflecting mirror 16 positioned at the first position (III) and the reflecting plate 6 positioned at the first position (I) in the dashboard through the upper semicircular space 2a of the steering wheel 2 in the same manner as the first embodiment.

The operating function of this second embodiment described above will be further described in detail. When the vehicle speed reaches a predetermined speed, the speed signal from the speed sensor 14 exceeds the set reference speed signal, so that the motor drive circuit 7 and the solenoid drive circuit 19 are activated by the signal from the CPU 13, the motor 8 is driven in a predetermined direction, and the solenoid 20 is energized.

As described above, the reflecting plate 6 is moved to the upper second position (II), the shaft 6b provided at the lower end thereof is stopped at the upper end position of the male threaded rod 9, and a part of the reflecting plate 6 is supported by the opening 5c of the dashboard 5. Simultaneously, the reflecting mirror 16 is rotated to the second position (IV) against the spring 17 by the energization of the solenoid 20.

In this manner, the reflecting surface 6a of the reflecting plate 6 is inwardly inclinedly supported as compared with when it is positioned at the first position (I), and the reflecting surface 16a of the reflecting mirror 16 is supported upward as compared with when it is positioned at the first position (III). Thus, the images indicated on the surface 4a' of the indicator 4' are reflected by the reflecting surface 16a of the reflecting mirror 16 and then again reflected on the reflecting surface 6a of the reflecting member 6 so as to be visually observed by the driver.

As described above, in both the first and second embodiments, when the vehicle is traveled at a high speed, the driver observes the position far ahead of the vehicle wherein the visual line of his eye is in the raised position. In this case, the indicated images can be smoothly visually observed by the reflection of the reflecting member 6 positioned at the above second position (II).

However, the reflecting plate 6 and the reflecting mirror 16 can be switched at their positions regardless of the vehicle's speed. In this case, the reflecting plate 6 and the reflecting mirror 16 can be shifted at their required positions by operating the manual switch 15 connected to the CPU 13 at a desired point.

In both the first and second embodiments, the indicator may preferably employ a fluorescent display tube, a light emitting diode, a transparent type liquid crystal having a backlight, and a vehicle speed, an engine rotating speed, a coolant temperature, residual fuel amount, other alarms, etc. may be displayed on the displaying surface of the indicator.

The reflecting plate 6 may employ a total-reflecting mirror, but may also employ a semitranslucent mirror, so that the driver can visually observe the field in the forward direction of the windshield and the images displayed on the displaying surface in superposition.

Other means, such as gearing mechanism, a belt mechanism, etc. may be employed as upward or downward moving means for the reflecting plate without being limited by the embodiments described above.

According to the present invention as described above, the height of the reflecting surface of the reflecting plate is switched in response to the variation at the position of the driver's visual point due to the alteration of the vehicle speed, thereby providing an effect of indirect visual observation of the image indicated by the indicator always in a preferable state.

What is claimed is:

1. An indication display unit for a vehicle comprising:
   an indicating means provided on a steering column for indicating driving information of the vehicle;
   a reflecting means provided at a dashboard for reflecting information indicated by said indicating means from a surface of said indicating means to a driver, said reflecting means including a first shaft protruding from at least one lateral end thereof and a second shaft provided at an upper portion; and
   a drive mechanism for shifting a position of said reflecting means in an upward and downward direction to adjust a height thereof for reflecting said information at an effective angle toward the driver in accordance with a vehicle speed, said drive mechanism includes
      a drive motor that rotates in accordance with the vehicle speed,
      a male threaded rod that transmits the rotation of the motor, and
      an elevation means having
         a female threaded portion to be engaged with said male threaded rod,
         a hole to be engaged with said first shaft of said reflecting means, and
         a guide means formed with a guide slot having an open upper end, said second shaft to be engaged with said guide slot of said guide means when said drive mechanism moves said reflecting means in said downward direction.

2. An indication display unit for a vehicle as claimed in claim 1, wherein said drive mechanism is provided at a dashboard side.

3. An indication display unit for a vehicle as claimed in claim 2 further comprises;
   a manual switch for manually adjusting the height of said reflecting means.

4. An indication display unit for vehicle comprising:
   an indicating means for indicating driving information of the vehicle;
   a first reflecting means, provided at a dashboard, for reflecting information indicated by said indicating means from a surface of said indicating means to a driver, said first reflecting means includes a first shaft protruding from at least one lateral end thereof and a second shaft provided at an upper portion;
   a drive mechanism for shifting a position of said first reflecting means in an upward and downward direction to adjust a height thereof for reflecting said information at an effective angle toward the driver in accordance with a vehicle speed, said drive mechanism includes
      a drive motor that rotates in accordance with the vehicle speed,
      a male threaded rod that transmits the rotation of the motor, and
      an elevation means having
         a female threaded portion to be engaged with said male threaded rod,
         a hole to be engaged with said first shaft of said first reflecting means, and
         a guide means formed with a guide slot having an open upper end, said second shaft to be engaged with said guide slot of said guide means when said drive mechanism moves said first reflecting means in said downward direction; and
   a second reflecting means having surface face toward the surface of said indicating means and a surface of said first reflecting means, wherein information indicated by said indicating means is reflected toward said first reflecting means.

5. An indication display unit for a vehicle as claimed in claim 4, wherein said indicating means is provided at a dashboard side, whereas said second reflecting means is provided at a hand column side.

6. An indication display unit for a vehicle as claimed in claim 5 further comprises;
   a manual switch for manually adjusting the height of said first reflecting means.

7. An indication display unit for a vehicle as claimed in claim 1 or 4, wherein said motor is connected to a CPU which is further connected to a vehicle speed sensor.

8. An indication display unit for a vehicle as claimed in claim 1 or 4, wherein said drive mechanism can be switched from an automatic drive mode to a manual drive mode.

* * * * *